July 17, 1928.                                                              1,677,856
W. C. WRIGHT
AUTOMATIC MOISTURE CONTROL
Filed Nov. 17, 1922                    3 Sheets-Sheet 1
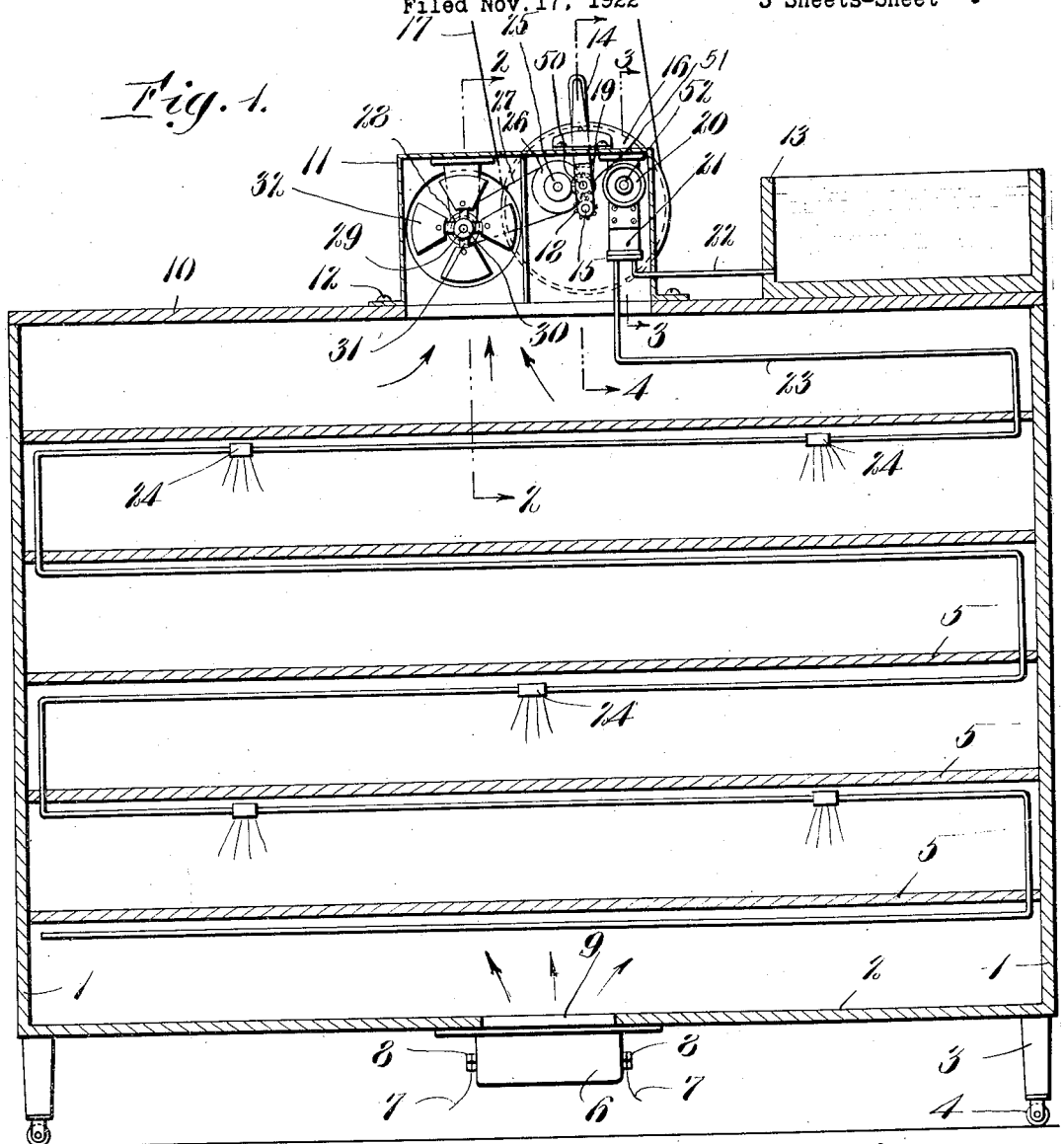
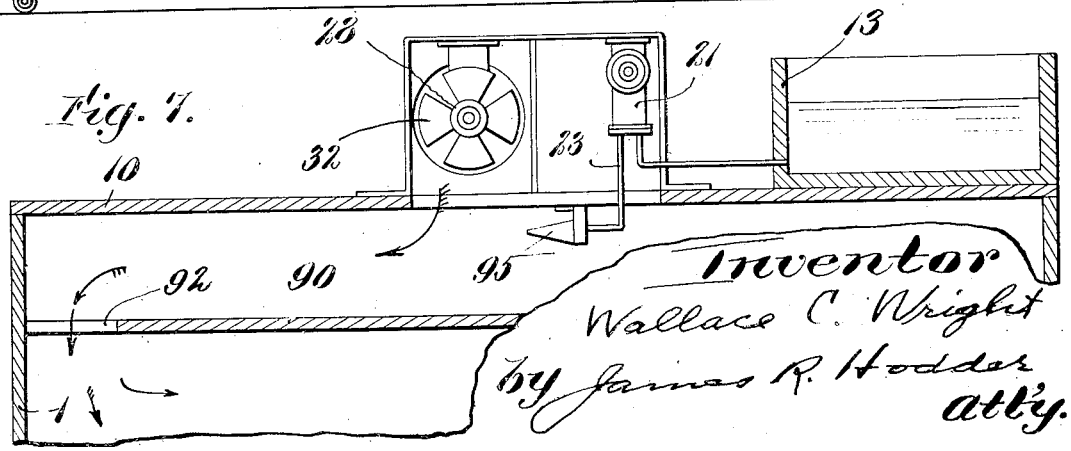
Inventor
Wallace C. Wright
by James R. Hodder
att'y.

July 17, 1928.  1,677,856
W. C. WRIGHT
AUTOMATIC MOISTURE CONTROL
Filed Nov. 17, 1922  3 Sheets-Sheet 2
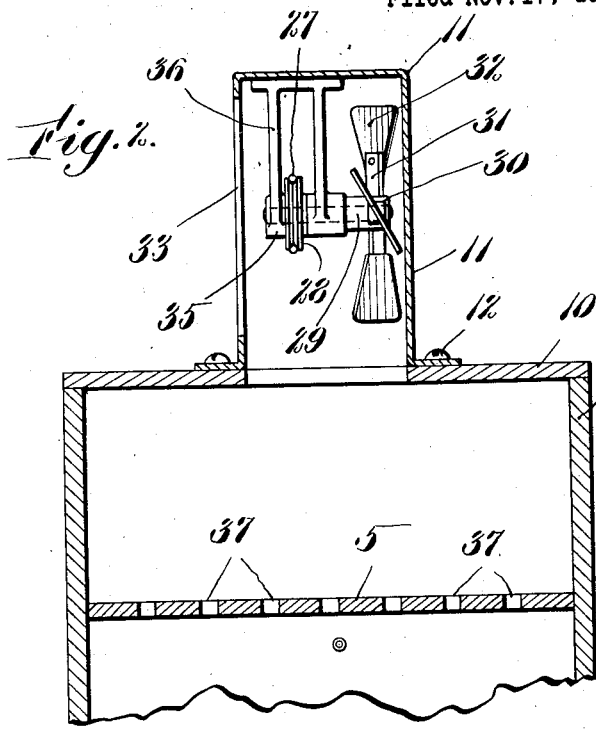
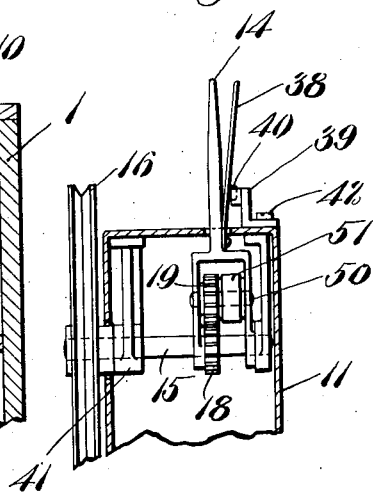
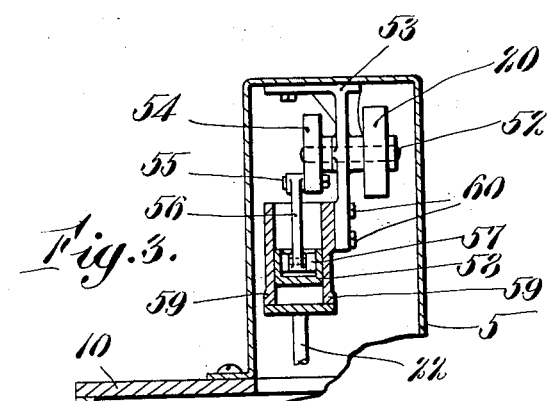
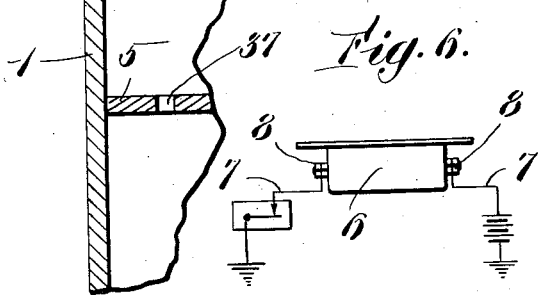
Inventor
Wallace C. Wright
by James R. Hodder
atty.

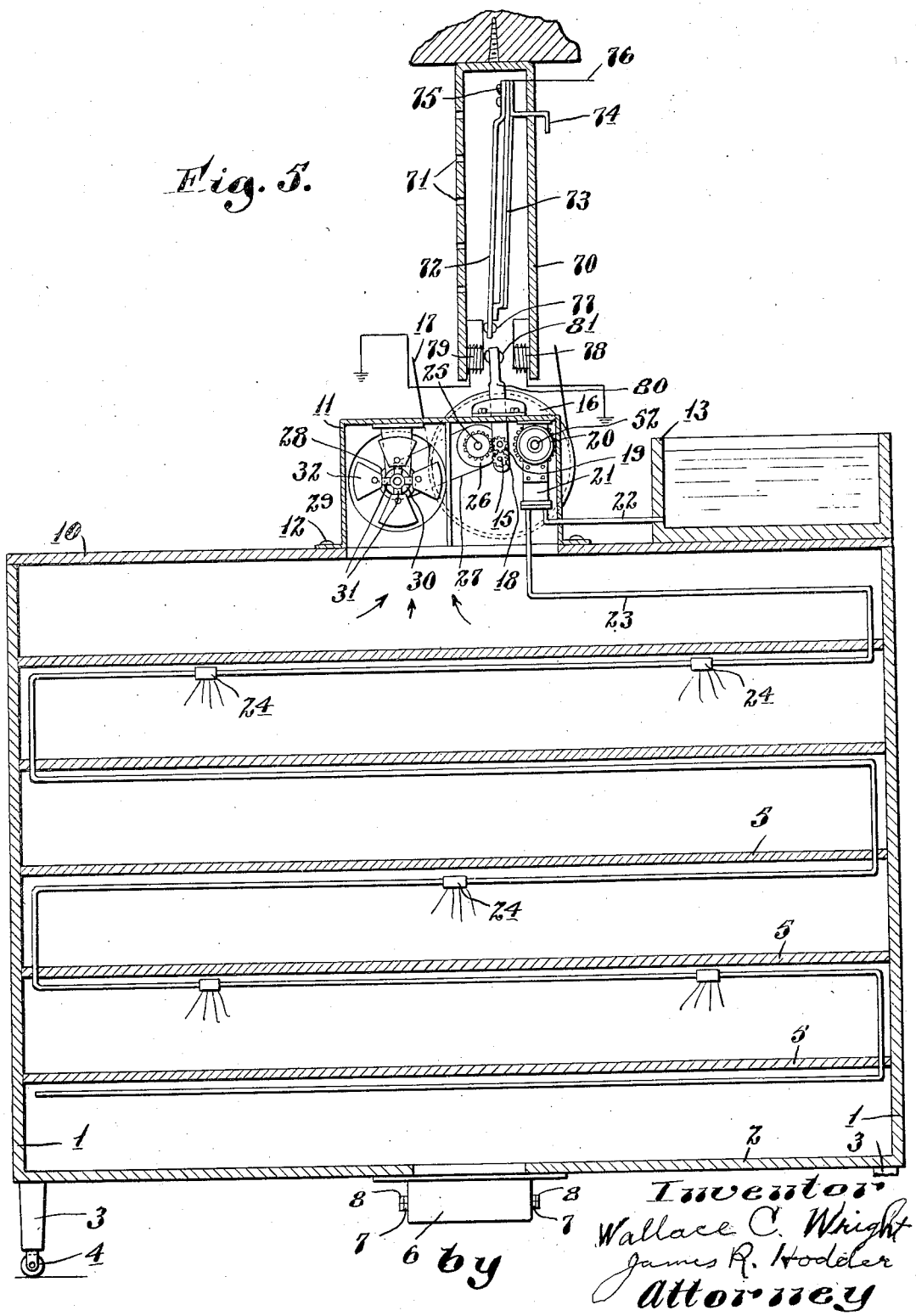

Patented July 17, 1928.

1,677,856

UNITED STATES PATENT OFFICE.

WALLACE C. WRIGHT, OF BROOKFIELD, NEW HAMPSHIRE, ASSIGNOR TO AMERICAN SHOE MACHINERY COMPANY, OF EAST BOSTON, MASSACHUSETTS, A CORPORATION OF MASSACHUSETTS.

AUTOMATIC MOISTURE CONTROL.

Application filed November 17, 1922. Serial No. 601,599.

My present invention relates to moisture controlling means and more particularly to automatic means for such moisture control.

My invention is a novel form of apparatus whereby the humidity in a room, cabinet, closet or container of any kind, can be positively regulated, manually or automatically, so as to maintain at all times predetermined degree of moisture.

Broadly considered, I contemplate the provision of means which will positively control the humidity as well also as means to control the degree of temperature, in any enclosure by mechanism to supply needed moisture or heat as well, also, as a mechanism to supply needed dryness or relatively less heat. This may be accomplished by different controls—thermostatically, automatically, or manually—operating through the same power but through different media. I am aware that it has been customary heretofore to supply moisture to rooms or small humidifying receptacles, which moisture was for the purpose of maintaining articles in condition, but I believe it to be a distinct novelty to provide means which will both supply moisture and withdraw it, supply heat and cool it, supply a current of moisture diffusing air or a current of moisture absorbing air. In order to positively, accurately and efficiently maintain the articles within the enclosure at or substantially at a predetermined condition. Furthermore my invention being applicable directly to leather where a large amount of tempering liquid is required, is, I believe, vastly different from the prior devices such as spraying moisture in a woolen factory or the like. Leather is an article capable of absorbing relatively large proportions of moisture, water or liquid, and must be so treated in order to render it "in temper" as is well known. Consequently, prior devices adapted to only spray moisture or water into a room were not suitable for use in tempering leather, and could not maintain a predetermined degree of moisture in an enclosure because lacking in the important feature of having means to withdraw surplus moisture. Furthermore my invention contemplates this tempering treatment to be either in a room, closet, receptacle, portable container or other enclosure.

I have herein shown my present invention as embodied in a portable mulling receptacle, which is used for the purpose of keeping leather in tempered condition until such time as it is desired to use the same. In a device of this character, heat is supplied to it by any usual means, in combination with moisture, to keep the stock in the tempered condition desired. Also if the receptacle or container becomes too hot or too moist, my invention includes means to quickly cool the same, or remove the surplus moisture, by the sucking or drawing out of the heat or moisture from within.

It is necessary ordinarily to temper leather or to maintain it in temper before it is used, and particularly is this true of leather in the manufacture of shoes, especially shoe sole blanks, heel blanks, and the like. With the machines and apparatus in use at the present time, it is customary to temper the leather just before using, in order that its tempered condition may not be lost before it is used. As is well known, leather is extremely susceptible to atmospheric changes of any character, and dries very quickly, unless properly taken care of. It also absorbs moisture rapidly and if left in a moistened condition too long, is apt to rot and thereby become damaged.

Oftentimes leather is tempered at the shoe factories, as for instance on Saturdays, or on a day before a holiday, when it is necessary to leave the same for two or three days before using it, and at present the leather has to be retempered before being used, thus necessitating increased labor, expense and time, and deteriorating of the leather by successive wettings and dryings.

A further object of the invention is to provide means whereby the moisture applied to the container will be distributed evenly throughout the entire container. This prevents uneven moistening of any of the stock, and keeps the leather in the same evenly tempered condition in which it was placed in the mulling receptacle or other container. I may supply moisture in any desired way, either by spraying the same directly into the enclosure or container, preferably at a plurality of points, or by spraying the moisture directly into a current of air which will be conducted to the enclosure, and thus have the air current saturated with the tempering liquid. Conversely in removing surplus moisture it is contemplated to force or draw through the receptacle one or more currents of air unsaturated so that the surplus moisture will be absorbed thereby, or to draw or force heated air which will more quickly and efficiently remove the surplus moisture.

Any desired or suitable controlling means to produce first the moisture charging and then the moisture removing action, either with or without heat, can be employed, and while I contemplate a thermostatic control, both a manual and automatic control are illustrated herein.

Further objects of the invention, novel combinations of parts and advantages will be hereinafter more fully pointed out and claimed.

Referring to the drawings, illustrating a preferred embodiment of my invention,

Fig. 1 is a cross-sectional view of an apparatus embodying my invention;

Fig. 2 is a sectional view on the line 2—2 of Fig. 1;

Fig. 3 is a sectional view the upper part of which is taken on the line 3—3 of Fig. 1;

Fig. 4 is a sectional view on the line 4—4 of Fig. 1;

Fig. 5 illustrates a modification of my invention, the same being automatically, instead of manually, operated;

Fig. 6 illustrates the heating element used in connection with the heating of the mulling apparatus; and Fig. 7 is a diametric view of a modified construction wherein I supply moisture to a current of air before the air enters the receptacle, thus charging the air current with the degree of moisture desired before it enters the enclosure.

Referring to the drawings, I have illustrated a portable apparatus, closet or machine of usual form illustrating my invention. In these drawings 1 designates the side walls of the mulling apparatus and 2 the bottom portion of the same, this bottom portion 2 being attached to legs 3 which bear on casters or rollers 4, thus rendering the same movable at will throughout the factory, to any desired point.

In the interior are a plurality of shelves 5, adapted to receive and hold leather, shoes or other material to be kept in tempered condition, or in fact to temper the same, on which shelves are stacked the piles of material to be treated.

To the bottom of the plate 2 is attached a heating unit or element of any desired size or form, here shown as a small electrical heater 6, to and from which current is led by the conducting wires 7, attached thereto at the terminals 8. The bottom plate 2 has therethrough an aperture 9 which permits the heat from the unit 6 to radiate in an upward direction, as shown by the arrows, so that the heat will penetrate all portions of the container.

The manual and automatic controls are secured at the top 10 of the apparatus and are preferably enclosed in a casing or cover 11, the same being secured by screws 12. A tank to hold water, tempering liquid or chemical is shown at 13.

Referring to Fig. 1 the manually controlled devices include a clutch member or lever 14, pivotally mounted at its lower end to a driving shaft 15, which shaft is secured to a driving wheel or pulley 16, operated by a belt 17 from any suitable source of power (not shown). Also to the driving shaft 15 is keyed a gear wheel 18, in constant mesh with a second gear wheel 19, so that when the wheel or pulley 16 is rotating, the two gears 18 and 19 are also in action. This gear 19 also rotates a shaft 50, on which is secured a roll or disc 51. When it is desired to introduce water or moisture to the interior of the apparatus, the clutch handle 14 is moved to the right, as viewed in Fig. 1, whereupon the disc 51 would engage with another disc wheel 20, which latter wheel is secured to the driving shaft of a pump 21. Leading from the tank 13 to the pump 21 is a pipe connection 22 through which water is taken into the pump 21 and driven therefrom through the discharge pipe 23, which discharge pipe is so positioned in the apparatus that it penetrates all sections of the chamber and has secured thereto, at various intervals, spray nozzles 24 through which the water from the pump 21 is sprayed, thus moistening all the interior of the apparatus and hence tempering the articles on all the shelves.

When the moisture content of the receptacle exceeds a desired amount, and it is desired to reduce or remove the surplus moisture from the container, the clutch 14 is moved to the left as viewed in Fig. 1, thus releasing the disc 51 from connection with the wheel 20 and bringing the friction pulley or disc 51 into connection with another wheel 25. Secured to the same shaft as the wheel 25 is a pulley 26, which has passing thereover a belt or strap 27, said strap also passing around a pulley 28 keyed or otherwise secured to the shaft 29. To this shaft 29 is attached a collar 30, having thereon a plurality of projecting lugs 31, said lugs having attached thereto the blades 32 forming a fan.

Upon contact of the wheels 25 and 51, the fan is set in motion, thus creating an air current and drawing out the air that is within the receptacle, as shown by the direction of the arrows and forcing ejectment from the container through the aperture 33, as shown in Fig. 2. This also tends to reduce the temperature and cool the interior of the apparatus.

As shown in Fig. 2, the fan shaft 29 is pivotally secured in a member 35, suspended from and as an integral part of bracket members 36, secured in any desired way to the upper part of the casing 11. In this figure also are shown apertures 37 in each shelf through which air and moisture will flow and also providing uniformity in all parts of the enclosure, permitting intermingling of air and moisture and even distribution of tempering action.

Fig. 4 shows an enlarged detail of the clutch mechanism, illustrating the driving pulley 16, shaft 15, holding bracket 41 for the driving shaft and pulley, clutch member 14, with the spring grip 38 thereon to keep the clutch in position by engaging with the projecting portions 40 on the upstanding member 39, which is secured to the top of the casing 11 by screws 42 or otherwise. The friction wheel 51 is also shown on the same shaft 50 with the gear member 19.

Fig. 3 shows a section of the pump mechanism preferably utilized, although it will be appreciated that I am not limited thereto and can use any desired form of pump or force, such as gravity. In this figure the pump driving wheel 20 is shown secured to the shaft 52, this shaft running in bearings in the bracket member 53, said bracket member also extending below the shaft 52 and having attached thereto one part 59 of the pump chamber by bolts 60. To the end of the shaft 52 opposite the wheel 20 is another wheel 54, keyed or otherwise secured to the shaft 52, this wheel carrying near its outer periphery, a wrist pin 55, to which is pivotally secured the link 56 for operating the plunger or piston 58. The link 56 is pivotally mounted in the portion 57 of the piston 58.

The operation of my mechanism as thus far described will be readily understood. With the clutch member 14 in straight up-and-down position, the gears 18 and 19 are alone in mesh, or may be continually rotating, and neither the fan nor the pump is operating. Heat from the heating element 6 may be on or off as desired. When it is desired to moisten the interior of the chamber and also the stock therein contained, the clutch 14 would be moved to the right, as viewed in Fig. 1, whereupon the wheel 51 would engage the wheel 20 and operate the pump, thus spraying water through the nozzle portions 24 and distributing the same throughout the receptacle. When desired to withdraw the moisture or to cool the interior of the chamber, the clutch 14 would be moved to the left, stopping the pump, and as viewed in Fig. 1, the wheel 51 engaging the wheel 25, with a consequent rotation of the fan and suction of the heat or moisture up through the chamber and expulsion of the same through the aperture 33. Thus an even degree of moisture can be maintained at all times within the receptacle.

Although as thus far described, the operation of my novel apparatus has been entirely manual, I may desire to operate the same automatically, and for this purpose have shown in Fig. 5 a hygroscopic arrangement for automatically operating the clutch member and consequently the pump or fan as heretofore explained.

This hygroscopic device is positioned in an enclosing casing 70, having therethrough in one side apertures 71 through which moisture may be admitted to act upon the hygrometer 72. The hygrometer 72 is of usual form and is attached to a spring plate 73 both being secured to a member 74 attached in the upper portion of the wall 70 by rivets 75 or otherwise. The circuit closer 77 is electrically connected by a conducting wire 76 to a suitable source of supply. Contact members are shown at 78 and 79. I have shown a clutch member 80 similar to the clutch member 14 and performing the same functions as the clutch 14. This clutch 80 is provided with contact points 81. Upon expansion of the hygrometer 72, the steel plate will be sprung in the direction of the contact 79, and upon coming in contact with the same, the clutch 80 will be drawn in the same direction, thus operating the fan to expel the air from the interior. Upon contraction of the hygrometer, the same will move in the direction of the contact 78, setting up a magnetic attraction which will draw the clutch in an opposite direction, operating the pump and causing the moisture to again flow through the apparatus. A similar control of the heater 9 may be arranged.

As shown in Fig. 7, I have illustrated the receptacle as provided with an air treating channel 90, formed by a partition 91 permanently dividing the channel 90 from the rest of the apparatus and leaving an opening 92. In this form the pump 21 draws liquid from the tank 13 in the same manner, when the pump is actuated, but the fan 28 is also actuated in the direction to force air into the channel 90, while the pump will deliver liquid through the pipe 23 and out of a spraying nozzle 95 directly into the air channel 90 and into the current of air being forced therethrough. In this manner the air is surcharged with moisture prior to entering into the enclosed part of the receptacle. In the reverse action of the fan 28 the pump is of course discontinued and air drawn over the heater 9 and surplus moisture thus reduced, as already described.

My invention being specially applicable for use with leather and particularly such heavy grades of leather as that used in manufacture of belts and soles for boots and shoes, it is important that a relatively large volume of tempering liquid be supplied, when the leather is in a very dry state, as well as when certain different grades and kinds of leather are being treated. My apparatus is capable of handling the moisture content for such treatment by the size and capacity of the pump or liquid outlets. When such leather has been tempered heretofore and it is desired to only maintain the same in their already tempered condition, then, of course, the pump will be actuated only at relatively long intervals and for a short time. The liquid supplying or liquid removing operations being in the nature of continuous action it is feasible to have a relatively small motor and pump and fan to handle comparatively large enclosures and receptacles and a mass of material, because of the continued moisture giving or moisture removing actions, which will at some point of time in their actuations reach the desired extent of either moisture or dryness.

I also contemplate utilizing an electric motor or motors as the source of power, but this adaptation being in any well-known arrangement and equivalent to the power driven arrangements illustrated, is not shown. In such electric motor driven arrangement I would preferably start and stop the motor automatically by means of a thermostat or hygroscopic control.

Furthermore, I contemplate the utilization of a machine for tempering leather, such for example as that shown by my prior Patent No. 1,313,510, issued August 19, 1919, working in combination with a device of the present kind to temper leather and immediately thereafter deliver the same or have the tempered leather delivered to a receptacle of the kind described herein, thereby completing the tempering and then the continued maintenance at temper of leather or articles capable of being similarly treated.

My invention is further described and defined in the form of claims as follows:

1. In a machine of the kind described, the combination of a storage chamber having therein perforated shelves to receive stock to be retained in tempered condition, a liquid supply tank, means for distributing the liquid from said tank simultaneously at a plurality of points throughout said chamber, a suction fan for withdrawing heat or moisture from the chamber to maintain the same at an even humidity, and moisture responsive means to regulate the injection and expulsion of moisture to and from said chamber.

2. In a machine of the kind described, the combination of a storage chamber, a plurality of shelves located therein and dividing the chamber into a plurality of compartments, said shelves being each provided with a plurality of perforations, whereby passage of heat and moisture throughout the chamber is facilitated, a liquid supply tank, means for withdrawing the liquid from said tank at will, a distributing means connected to said withdrawing means and extending through each compartment of the chamber, a suction fan for withdrawing heat or moisture from the chamber and expelling it from the chamber to maintain the chamber at an even humidity, and moisture responsive means to regulate the injection and expulsion of moisture to and from said chambers.

In testimony whereof, I have signed my name to this specification.

WALLACE C. WRIGHT